United States Patent [19]
Reed

[11] Patent Number: 5,142,700
[45] Date of Patent: Aug. 25, 1992

[54] PROTECTIVE HELMET CONTAINING AN INTEGRAL TRANSCEIVER

[76] Inventor: John W. Reed, 5340 Terry Ave., St. Louis, Mo. 63120

[21] Appl. No.: 572,562

[22] Filed: Aug. 27, 1990

[51] Int. Cl.⁵ .............................................. H04B 1/10
[52] U.S. Cl. ..................... 455/344; 455/351; 455/90
[58] Field of Search ............ 455/89, 90, 344, 347, 455/351; 2/5, 6, 10, 173, 205

[56] References Cited

U.S. PATENT DOCUMENTS

| | | | |
|---|---|---|---|
| 2,904,645 | 9/1959 | Sarles | 455/344 |
| 4,152,553 | 5/1979 | White | 455/351 |
| 4,607,395 | 8/1986 | Sundahl | 455/90 |
| 4,882,745 | 11/1989 | Silver | 455/90 |

FOREIGN PATENT DOCUMENTS

| | | | |
|---|---|---|---|
| 0740988 | 8/1966 | Canada | 455/90 |
| 0199523 | 8/1988 | Japan | 455/90 |

*Primary Examiner*—Curtis Kuntz
*Attorney, Agent, or Firm*—Richard C. Litman

[57] ABSTRACT

A protective helmet, such as a football helmet, motorcycle helmet, construction helmet, or the like comprises a shell made of impact-resistant material. Inside of the helmet is a complete transceiver system which allows two-way wireless communication between persons in the same location or to a remote base unit. No components of the system protrude from either the interior or exterior of the helmet shell as the antenna follows the configuration of the shell centerline while one or more microphones are contained within elements of the face guard. A switch device, also contained within the face guard and including an illuminated element, is disposed within the field of view of the wearer.

9 Claims, 2 Drawing Sheets

PROTECTIVE HELMET CONTAINING AN INTEGRAL TRANSCEIVER

FIELD OF THE INVENTION

The present invention relates to a protective helmet, such as a football helmet, motorcycle helmet, construction helmet, and the like, which allows two-way communication either between persons in immediate proximity to one another or, with individuals situated at a remote location and operating with a base transceiver unit.

BACKGROUND OF THE INVENTION

Protective helmets with two-way communication systems are generally well known. Some of these well-known systems carry a transmitting unit within the helmet, but have the disadvantage of using an umbilical cord to a base unit. Such a unit is not a complete and self-contained system. Other known units have an external antenna, are not protected from shock, and provide earphones which may completely cover the ear. Still other known units do not provide a proper cushioning for the electronics itself. Consequently, the electronics may be damaged from impact to the helmet.

Also, known systems have not provided a safe and convenient means of mounting the microphone of the system, especially for helmets with a face guard.

The present invention eliminates these aforementioned problems by a novel approach to the entire concept of protective helmets providing two-way communication systems.

DESCRIPTION OF THE RELATED ART

U.S. Pat. No. 2,619,639 issued to E. Hendler on Dec. 2, 1952 discloses a flight helmet containing headphones and a microphone. The radio transceiver is remotely located from the helmet itself.

U.S. Pat. No. 2,904,645 issued to G. A. Sarles on Sep. 15, 1959 comprises a football helmet containing a receiver, headphones, and other necessary components. The patent also provides for the installation of the device in various other types of helmets, such as construction helmets, and the like. No transmitting means is disclosed, however.

U.S. Pat. No. 3,559,209 issued to E. G. Vail on Feb. 2, 1971 discloses an astronaut's protective suit which provides for a radio transceiver system and related components. Although this patent also suggests that there is also provision in the helmet pad area for the installation of a space transceiver system, the unique combination as specifically set forth in the instant invention is not seen therein.

None of the prior art, however, is felt to suggest applicant's unique arrangement of components within a protective helmet.

SUMMARY OF THE INVENTION

By the present invention, an improved protective helmet including a completely self-contained transceiver system is provided and which is particularly applicable for incorporation within a sports helmet or any other type of protective headgear having a face guard. Quite obviously such helmets must serve their primary duty without interference from any disparate components or equipment. The instant helmet accomplishes this by fitting headphones within the existing protective padding adjacent each ear opening within the helmet shell and thus presents no obstruction to the wearer's ability to receive the usual verbal instructions from team mates, umpires and coaches. The microphone is fully contained within the confines of one or more elements of the face guard assembly and with its voice-sensitive surface flushly disposed with the rear or inner surfaces of the face guard elements. The electronics of the transceiver unit as well as the antenna and connecting wiring are all either flushly disposed relative the helmet components or contained therewithin.

Accordingly, one of the objects of the present invention is to provide an improved protective helmet wherein all of the elements of a transceiver system are completely within the confines of the helmet structure.

Another object of the present invention is to provide an improved football helmet containing a completely self-contained transceiver system and including one or more microphones flushly mounted within elements of the face guard.

An additional object of the present invention is to provide an improved protective helmet having the primary electronic board of a transceiver system, flushly mounted within the helmet shell.

Yet another object of the present invention is to provide an improved protective helmet which includes a radio transceiver system having speakers contained within the protective padding adjacent each helmet ear opening.

A further object of the present invention is to provide an improved sports helmet having a transceiver therein and with its antenna contained within the non-conductive material of the shell.

With these and other objects in view which will more readily appear as the nature of the invention is better understood, the invention consists in the novel combination and assembly of parts hereinafter more fully described, illustrated and claimed with reference being made to the attached drawings.

BRIEF DESCRIPTION OF THE DRAWINGS

Similar reference characters designate corresponding parts throughout the several figures of the drawings.

DESCRIPTION OF THE PREFERRED EMBODIMENT

Figure 1:
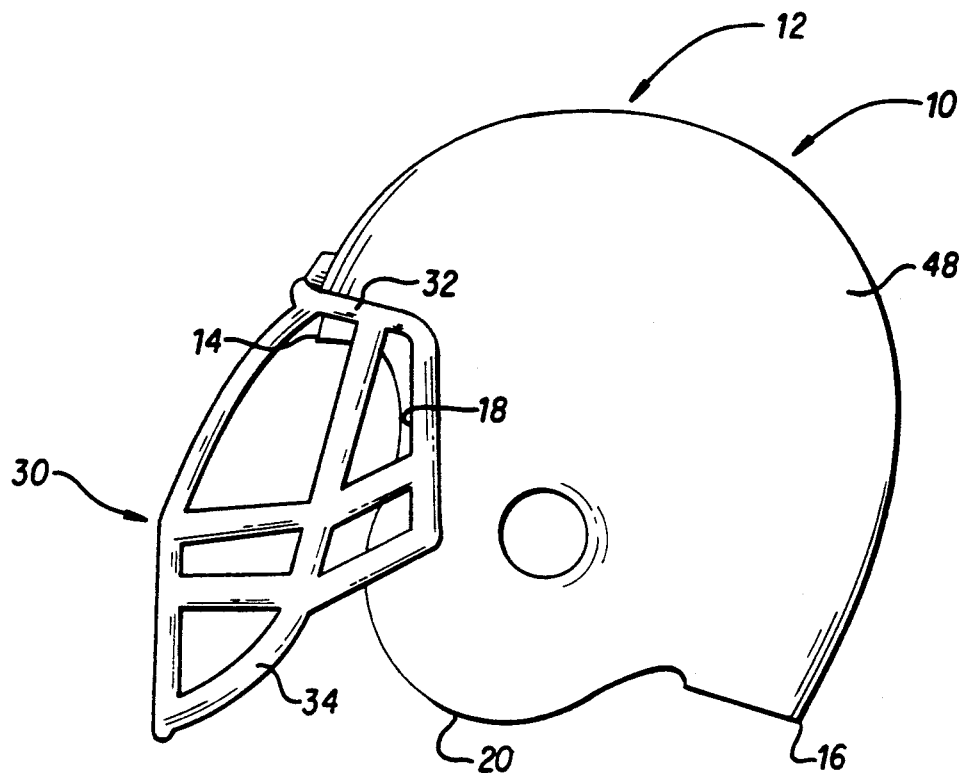
FIG. 1 is a side elevation of an exemplary helmet employing the present invention.

The helmet 10 of the present invention as shown in FIG. 1 is adapted to provide both head protection to a user and to allow two-way wireless communication to a remote party. This helmet is designed to operate on a similar basis as a modern-day walkie-talkie, operating on its own power source. It can transmit and receive audio signals by means of a microphone high energy cell and/or super conductor transmitter-and-receiver combination, antenna, and earphones. Similar to the walkie-talkie, it can operate on an assigned or general frequency. The microphone, headphone and electronic components are easily accessible for repair or replacement.

The helmet 10 comprises a molded unitary shell 12 of suitable dielectric impact-resistant composition such as fiber reinforced plastics and in the case of a protective football helmet, includes a front rim 14 and opposite rear or neck rim 16. Face rims 18 are adjacent the front rim 14 and are joined to side rims 20 leading to the rear rim 16. Appropriate padding or cushioning material 22 is provided adjacent the shell inner surface 24 and includes ear cushions 26 adjacent the shell side rims 20 and which are provided with openings aligned with the ear openings 28 in the shell 12.

A face guard 30 is suitably attached to the front of the helmet 10 and includes any desired number of substantially vertical and horizontal bars or elements. The specific configuration of the face guard 30 may vary from that as shown in the drawings but will be understood to include a generally horizontal top bar 32 and bottom bar 34 together with any number of substantially vertical bars 36, 38, 40 and 42. At least the lowermost face guard element, or the bottom bar 34 will be disposed in a plane which is proximate that of the wearer's mouth, for reasons which will become apparent hereinafter.

Figure 2:
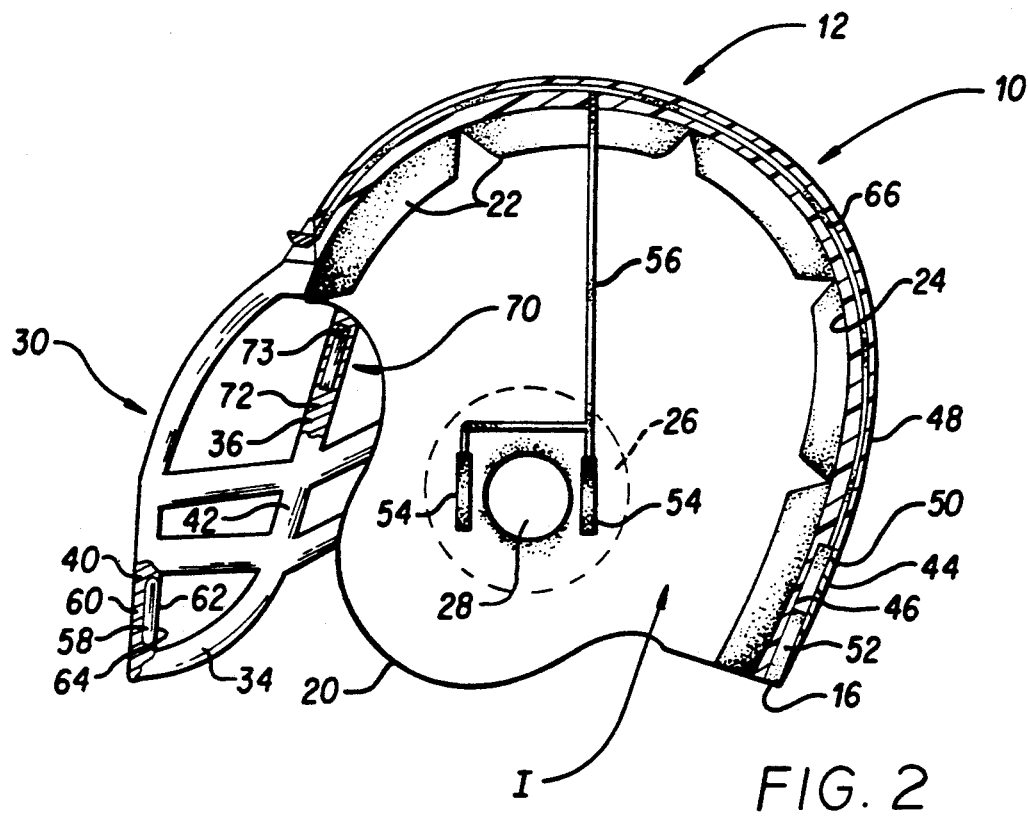
FIG. 2 is a cross-sectional view of the helmet of FIG. 1.

The wireless two-way communication capability of the instant helmet is provided by a solid state transceiver unit 44 removably mounted within a cavity 46 formed within the shell 12 adjacent the rear rim 16. This cavity may open either to the shell interior head cavity I or, as shown in FIG. 2, to the shell exterior surface 48. In either instance, a slidable or otherwise removable cover is provided for the cavity 46, such as the cover 50, which will be seen to repose flush with the surrounding shell surface. An appropriate power cell or super conductor 52 is provided within the cavity 46, adjacent the transceiver unit 44.

For receiving audio instructions from a remote transmitter, the helmet includes at least one and preferably two earphones or speaker units 54, 54 adjacent each helmet ear opening 28. This is to insure the adequacy of reception under the quite noisy conditions the helmet is used in. These speakers are preferably contained within the mass of the ear protective cushioning 26 immediately adjacent the opening 28. Wiring 56, which may include fiber optic or laser wiring in support of the speakers 54 as well as other wiring to support further components to be described, is preferably contained within the composition of the shell or face guard material and thus connects all of the components with the transceiver unit 44 in a protected manner.

Figure 3:
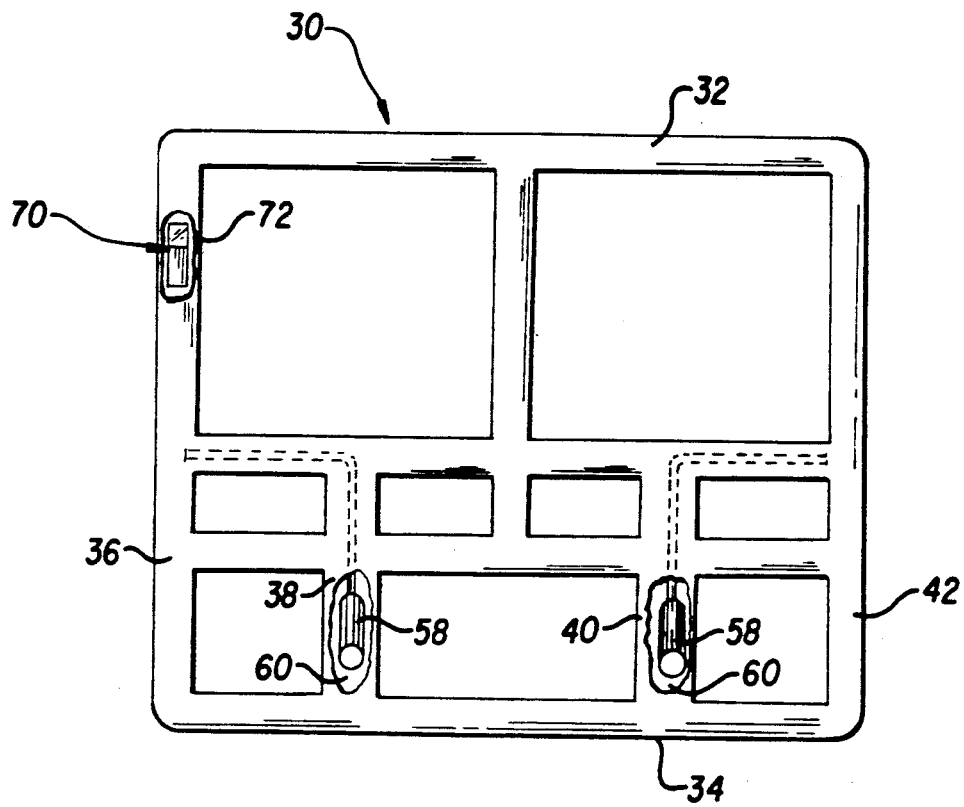
FIG. 3 is a front elevation of the face guard assembly of the helmet.

Transmitting with the present helmet is achieved by means of one or more microphones 58 mounted within the face guard 30. Two such microphones 58, 58 are shown in FIG. 3, mounted within the vertical bars 38 and 40, immediately adjacent the bottom bar 34. The compartment 60 within which these microphones are mounted will be seen to open to the rear or, to have their exposed audio sensitive surfaces 62 immediately juxtaposed the wearer's mouth. It is also desirable that these surfaces 62 be flush with the surrounding rearwardly facing surface 64 of the face guard bars. This latter feature reduces the likelihood of damage or interference during use of the helmet.

Figure 4:
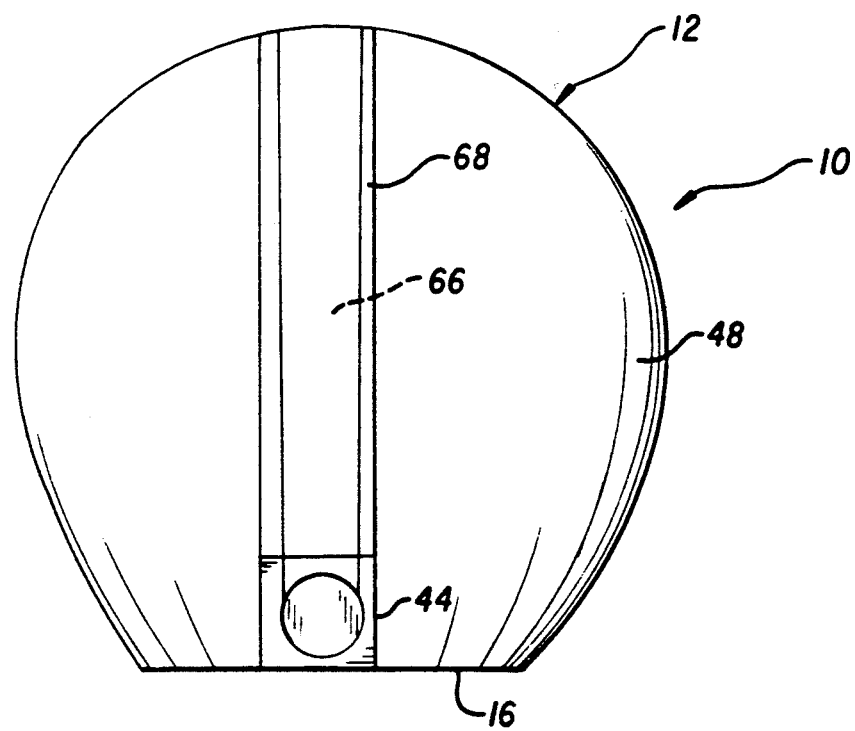
FIG. 4 is a rear elevation of the helmet.

An antenna, which may comprise fiber optic of laser wiring to permit the transmission and reception of RF energy from and to the transceiver 44 quite obviously can not comprise a rigid member projecting outwardly from the shell external surface 48. Nor could a flexible antenna be allowed to dangle from the helmet. These approaches are ruled out in view of the conditions under which the helmet is to be used. Accordingly, a fixed, elongated antenna member 66, such as one of fiber optic or laser wiring, is mounted to extend along the centerline of the shell, from the transceiver or super conductor unit 44 to the front rim 14. Such an antenna 66 may be positioned within the RF permeable material of the shell 12 as in FIG. 2 or otherwise affixed to the shell exterior, beneath a center cover or brace member 68 as in FIG. 4.

To control the operation of the subject helmet, suitable switch means 70 is mounted within an endmost vertical face guard bar 36. Like the microphone(s) 58, the switch device 70 if contained within the material of the face guard bar and its exposed surface is located on the inside face 72 of the bar 36. In this manner, the user need merely reach up and with their right thumb, manipulate the switch. Any suitable micro-switch may be utilized, preferably a three-way switch which turns the transceiver system on and off and provides a push-to-talk mode. An LED 73 may be included with the switch and may serve two functions. First, when illuminated, its brilliance will indicate the state of charge of the power cell 52 and secondly, when pushed forward, will indicate that the transceiver or super conductor unit 44 is turned on. With the location of the switch assembly 70 on the upper portion of the inside surface 72 of the side bar 36, immediately adjacent the shell face rim 18, it will be appreciated that it will be juxtaposed the wearer's eye and thus illumination of the LED 73 may always be determined.

It is to be understood that the present invention is not limited to the sole embodiment described above, but encompasses any and all embodiments within the scope of the following claims.

I claim:

1. A helmet to provide both head protection to a user in addition to allowing two-way wireless communication with a remote party, comprising;
   a shell of impact-resistant material having outer and inner surfaces bounded by a front rim, two face rims, two side rims and a neck rim,
   said shell inner surface defining a head-receiving cavity, cushion means within said cavity adjacent said shell inner surface,
   a face guard affixed to said helmet and including a plurality of bars having rearwardly facing surfaces juxtaposed a wearer's face,
   an RF transceiver disposed within said shell, earphones electrically joined to said transceiver and mounted within said shell cavity,
   a microphone electrically joined to said transceiver and fully contained within one said face guard bar, said microphone having an exposed audio-sensitive surface flushly disposed relative to said one face guard bar rearwardly facing surface,
   an antenna electrically joined to said transceiver, and
   said antenna comprising an elongated element following the configuration of said shell and extending upwardly and forwardly from a point substantially adjacent said helmet rear rim to said front rim.

2. The helmet as described in claim 1, wherein said helmet is a football helmet.

3. The helmet of claim 1, wherein
   said shell is provided with ear openings,
   said cushion means including padding surrounding said ear openings, and
   said earphones disposed within said padding adjacent said shell ear openings.

4. The helmet of claim 1, wherein at least one said face guard bars is juxtaposed a wearer's mouth.

5. The helmet of claim 1, wherein
said shell includes a compartment adjacent said neck rim,
said transceiver mounted within said compartment, and
a removable cover overlying said transceiver within said compartment.

6. The helmet of claim 1, including
a pair of said microphones contained within a pair of said face guard bars.

7. The helmet of claim 1, wherein
said antenna is disposed within said shell intermediate said shell outer and inner surfaces.

8. The helmet of claim 1, wherein
said antenna flushly overlies said shell outer surface, and
a cover member overlying said antenna.

9. The helmet of claim 3, including
a pair of said earphones adjacent each said shell ear opening.

* * * * *